UNITED STATES PATENT OFFICE.

GENNARO DORSO, OF SAN FRANCISCO, CALIFORNIA.

METHOD OF MAKING ORNAMENTAL ARTICLES.

1,396,267. Specification of Letters Patent. Patented Nov. 8, 1921.

No Drawing. Application filed March 7, 1921. Serial No. 450,405.

*To all whom it may concern:*

Be it known that I, GENNARO DORSO, a subject of Italy, and a resident of the city and county of San Francisco, and State of California, have invented certain new and useful Improvements in Methods of Making Ornamental Articles, whereof the following is a specification.

This invention relates to methods of making ornamental articles, such as baskets of artificial fruit and the like.

I will describe the invention with reference to a basket of artificial fruit, leaving it to the mechanic to use it for other purposes, if he desires.

Having selected a suitable basket for the purpose, I twine around its margin a wire of suitable gage, say No. 10, the wire being bent into loops and twisted like natural stem or branch. This wire I coat with a composition which I shape and configure with modeling tools, and to which I attach the imitation fruit and leaves. The fruit may be made of the same composition as the stem. This composition I make as follows:— I take of—

| | |
|---|---|
| Glue | 2 pounds, |
| Water | 1 gallon, |
| Sawdust | 1 pound, |
| Whiting | 15 pounds. |

These ingredients I thoroughly mix and incorporate with one another, until they are like a species of putty.

Leaves for the sprays, or branches, I form of two layers of fabric, such as unbleached muslin, glued together with a paste composition, to be presently described, with a wire between them. Wire of No. 15 gage is suitable for this purpose. The wire may be inserted far enough to give an imitation of the mid-rib of a leaf. The leaves, thus formed, may now be covered with one or more coats of the paste composition, and shaped or veined with modeling tools, and attached to the stem and fruit composition, by inserting the wires thereinto, and the fruit may be similarly attached to the stems by inserted wires.

The paste composition I make as follows:— I take of—

| | |
|---|---|
| Liquid glue | 1 pound, |
| Water | 1 gallon, |
| Whiting | 6 pounds. |

These ingredients I thoroughly mix and incorporate with each other.

This composition I apply with a brush.

The articles formed of these compositions may be burnished with a dry cloth.

These articles may be colored with dry paint mixed with dry japan, and may receive a finishing coat of the same dry paint mixed with dry japan and diluted with one gallon of turpentine to two pounds of that mixture of dry paint and japan.

Having thus described my process, in the full, clear and exact terms required by law, and knowing that it comprises novel, useful and valuable improvements in the art to which it pertains, I here state that I do not wish to be limited to the precise terms, steps and arrangements of the several parts, as herein set forth, as the same may be variously modified without departing from the spirit thereof.

What I claim and desire to secure by Letters Patent of the United States, is the following, to wit:—

1. The method of making ornamental articles by modeling them from a composition of glue, water, sawdust and whiting, attaching imitation articles to them by wires coated with said composition, and coloring said articles with dry paint and dry japan.

2. The method of making ornamental articles representing baskets of fruit, by modeling the fruit of a composition of glue, water, sawdust and whiting, modeling the stems of the same, the stem composition being based on a suitable bent wire, making leaves of two ply of fabric pasted together with a composition of liquid glue, water and whiting, securing them to the stem and fruit imitations by inserted wires, burnishing, and coloring the designs with dry paint and dry japan, and finishing with said mixture of paint and japan diluted with turpentine.

In testimony that I claim the foregoing I have hereto set my hand this 26th day of February, 1921.

GENNARO DORSO.